United States Patent [19]

Fang

[11] 3,928,492

[45] Dec. 23, 1975

[54] COATING COMPOSITIONS CONTAINING MIXED ESTERS OF DIBASIC UNSATURATED ACIDS, GLYCOLS AND GLYCIDYL TERTIARY ESTERS, POLYESTERS AND AMINE-ALDEHYDE RESINS

[75] Inventor: James C. Fang, Media, Pa.

[73] Assignee: E. I. Du Pont de Nemours & Company, Wilmington, Del.

[22] Filed: Mar. 12, 1973

[21] Appl. No.: 340,382

[52] U.S. Cl. .......... 260/850; 260/404.8; 260/475 P; 260/485 G
[51] Int. Cl.² .................... C08L 61/28; C08L 67/06
[58] Field of Search ................ 260/850, 468 K, 856

[56] References Cited
UNITED STATES PATENTS

| | | | |
|---|---|---|---|
| 3,414,635 | 12/1968 | Edwards et al. | 260/851 |
| 3,624,232 | 11/1971 | Dorp et al. | 260/850 |
| 3,663,598 | 5/1972 | Vasta | 260/468 K |

*Primary Examiner*—Murray Tillman
*Assistant Examiner*—J. Ziegler

[57] ABSTRACT

Coating compositions containing
   A. mixed esters of dibasic unsaturated acids, glycols and glycidyl esters,
   B. condensation products, and
   C. aminoplast resins
require little or no organic liquid carrier. These compositions are useful for finishing appliances and automobiles, and for general industrial use.

2 Claims, No Drawings

COATING COMPOSITIONS CONTAINING MIXED ESTERS OF DIBASIC UNSATURATED ACIDS, GLYCOLS AND GLYCIDYL TERTIARY ESTERS, POLYESTERS AND AMINE-ALDEHYDE RESINS

BACKGROUND OF THE INVENTION

The compositions described in U.S. application Ser. No. 338,053, filed Mar. 5, 1973 are in the forefront of technology because they are commercially acceptable paints which require little or no liquid carrier for application.

While these compositions give finishes with excellent characteristics, they have been found to be slightly deficient in the hardness and stain resistance required by the appliance industry.

It has now been found that these compositions can be significantly improved in these characteristics by blending them with condensation products.

SUMMARY OF THE INVENTION

The coating compositions of the invention contain three principal components.

The first is a mixed ester of a dibasic unsaturated acid with a polyol and with a glycidyl ester. The second component is a condensation product and the third is a conventional aminoplast resin.

The Mixed Ester

This ester is represented by the structural formula

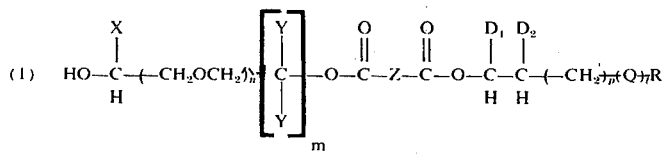

where
X is hydrogen, an alkyl radical of 1–4 carbon atoms or phenyl;
Y is hydrogen, —OH, —CH$_2$OH or an alkyl radical of 1–4 carbon atoms (only one Y can be —OH);
Z is

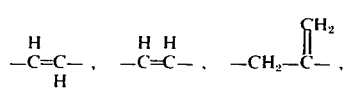

or

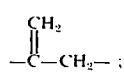

D$_1$ is hydrogen;
D$_2$ is —OH;
Q is

or —O—;
R is an alkyl radical of 4–18 carbon atoms, or a singly, doubly or triply unsaturated hydrocarbon radical of 17 carbon atoms;

$n$ is 0 or 1;
$m$ is 1–5;
$p$ is 0 or 1; and
$t$ is 0 or 1.

The mixed ester preferred for use is that represented by formula (1) where

I.
a. X is hydrogen, n is 0, m is 1 and Y is hydrogen;
b. X is hydrogen, n is 0, m is 1 and Y is —CH$_3$ and hydrogen; or
C. X is hydrogen, n is 0, m is 2 and Y is (1) hydrogen and —OH and (2) hydrogen and hydrogen; or II.
D$_1$ is hydrogen, D$_2$ is —OH, $p$ is 1, Q is

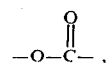

$t$ is 1 and R is

where R$_1$ is —CH$_3$ and R$_2$ and R$_3$ are lower alkyl, the total number of carbon atoms in R$_1$, R$_2$ and R$_3$ being 7–11.

The mixed ester is made by first reacting about 1 mol of a suitable dibasic unsaturated acid with about 1 mol of a suitable polyol according to the illustrative equation

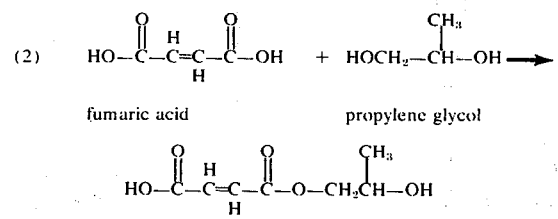

This reaction is catalyzed with about 0.25 percent, by weight, of toluenesulfonic acid, phosphoric acid, tetrapropyl titanate or dibutyl tin oxide. About 0.05 percent, by weight of an addition polymerization inhibitor such as p-methoxyphenol or hydroquinone is also added.

The acid and glycol are mixed and this mixture is held at 135°–146°C. under nitrogen until 1 mol of water has been given off. In the usual case this takes about 45 minutes to 1 hour.

About 1 mol of the resulting intermediate is then reacted with 0.4 to 1.0 mol of a glycidyl ester, a glycidyl ether or an alkylene oxide, according to the illustrative equation (3) 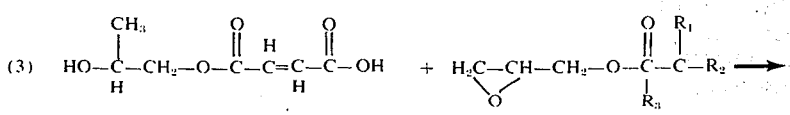 + 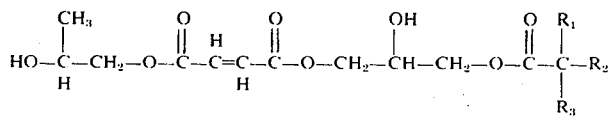 →

HO—C(CH₃)(H)—CH₂—O—C(O)—C(H)=C(H)—C(O)—O—CH₂—CH(OH)—CH₂—O—C(O)—C(R₁)(R₃)—R₂

[where R₁, R₂ and R₃ are as in formula (1)].

The reactants are mixed and the mixture is heated to 180°–200°C., under nitrogen, and held at that temperature for about 1 hour. Preparation of the mixed ester is then complete.

The dibasic unsaturated acids used in this process are fumaric, maleic and itaconic. Maleic anhydride can also be used.

Illustrative of polyols which can be used are ethylene glycol, 1,2-propanediol, 1,3-propanediol, 1,4-butanediol, 1,5-pentanediol, glycerol, 1,2,3-butanetriol, 1,2,3,4-butanetetrol, 1,6-hexanediol, neopentyl glycol, diethylene glycol, trimethylolpropane and trimethylpentanediol. Ethylene glycol, 1,2-propanediol or glycerol are preferred.

Illustrative of the glycidyl compounds which can be used are esters of glycidol with monobasic acids of 4–18 carbon atoms, such as glycidyl palmitate, glycidyl laurate and glycidyl stearate; alkylene oxides of 4–18 carbon atoms such as butylene oxide; and glycidyl ethers such as octyl glycidyl ether.

When R in formula (1) is an unsaturated hydrocarbon radical, the reactant used is a glycidyl ester represented by the structure

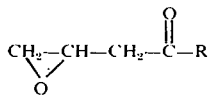

where R is a singly, doubly or triply unsaturated hydrocarbon radical of 17 carbon atoms.

This ester can be prepared by the reaction of a suitable soap with epichlorohydrin. When the soap is derived from a naturally occurring oil such as linseed oil, soya oil, safflower oil, tall oil, or chinawood oil, the glycidyl ester, and the final product it gives, is a mixture of compounds whose R groups vary from each other, the variance of course depending on the nature of the oil.

Especially preferred for use is a mixed glycidyl ester known as "Cardura E" ester[1] which is represented by the structure
[1] Sold by Shell Chemical Company.

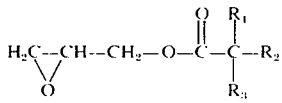

where R₁ is —CH₃ and R₂ and R₃ are lower alkyl, the total number of carbon atoms in R₁, R₂ and R₃ being 7–11.

It will be apparent from the foregoing equations that small amounts of isomers of the product shown will be formed. For example, when maleic acid is used, the product will partially isomerize to the trans form (Fumaric acid).

In addition, the intermediate, for the most part, opens the cyclic ether ring by reaction with the carboxyl group, as shown in equation (3). However, some rupturing is brought about by reaction with the hydroxyl group on the intermediate. This isomeric form is not represented by formula (1) because such small quantities are produced.

Similarly, the alkyl groups of X and Y in formula (1) can vary in position according to which hydroxyl group of an unsymmetrical glycol is attacked by the acid when the two are reacted as shown in equation (2).

These isomeric forms can be isolated from the main product by chromatographic techniques, if this is desired. But it has been found that isolation is unnecessary because all of the isomers are useful for the purposes already described. It is therefore preferred and recommended that the various isomers not be isolated.

In preparing the esters, one may use mixtures of acids, of glycols and of glycidyl compounds if he wishes to obtain a balance of properties. Suitable mixtures and the amounts in which the components of these mixtures are to be used will be immediately apparent to anyone versed in the polymer or paint art.

The Condensation Product

This is a material obtained by condensing
1. an unsaturated dibasic acid,
2. a polyol, and
3. an alkanol of 3–18 carbon atoms, or an alkylene oxide of 4–18 carbon atoms.

This product will have a molecular weight (weight average) of 250–1000, preferably 500–750.

The acid/polyol/alcohol-alkylene oxide mol ratio of this product will be in the range 2–5/2–5/1–2.5, preferably 2/2/1.

The condensation product can be prepared by mixing suitable polyols, an acid and an alkanol (or an alkylene oxide), in appropriate amounts, and 0.1 to 1 percent, by weight, preferably 0.5 percent, of a polymerization catalyst such as p-toluenesulfonic acid or dibutyl tin oxide. This mixture also preferably contains 0.01 to 0.1 percent, by weight, of a free radical polymerization inhibitor such as methyl hydroquinone.

After these components are thoroughly mixed, the mixture is stirred and held under a nitrogen blanket at a temperature high enough to drive off the water/alkanol azeotrope which forms. In a normal case this temperature will range from 140°–165°C. Heating and stirring are continued until the theoretical amount of water has been driven off, or until the acid number of the product reaches 30 or below. Usually heating will be continued for 4–8 hours.

The resulting product is a condensation product of the type described, ordinarily a pale yellow viscous liquid.

Illustrative of polyols which can be used are ethylene glycol, 1,2-propanediol, 1,3-propanediol, 1,4-butanediol, 1,5-pentanediol, glycerol, 1,2,3-butanetriol, 1,2,3,4-butanetetrol, 1,6-hexanediol, neopentyl glycol, diethylene glycol, trimethylolpropane, trimethylpentanediol, and pentaerythritol. Propylene glycol, ethylene glycol and glycerol are preferred. Mixtures of polyols can be used. To prepare a preferred condensation product, a mixture of glycerol and propylene glycol will be used.

Illustrative of the dibasic unsaturated acids which can be used are fumaric acid, maleic acid and itaconic acid. Of the alkanols of 3–18 carbon atoms which can be used, n-butanol is preferred.

Of the alkylene oxides of 4–18 carbon atoms which can be used, butylene oxide is preferred.

The Aminoplast Resin

The aminoplast resin used in the composition can be any of those freely available in the marketplace. Illustrative of such resins are melamine-formaldehyde, benzoguanamine-formaldehyde, urea-formaldehyde, melamine-toluenesulfonamide, hexamethoxymethylmelamine or any of the alkylated melamine-formaldehyde, benzoguanamine-formaldehyde or urea-formaldehyde resins. Those resins which are normally in a liquid state are preferred, especially hexamethoxymethyl-melamine.

How a Coating Composition is Made

A coating composition is made by simply mixing proper amounts of the three components together. The composition ordinarily contains 5–75 percent, by weight, of the mixed glycidyl ester, about 5–75 percent of the condensation product and about 20–50 percent of aminoplast resin, the total being 100 percent. The preferred compositions will contain 40–50 percent, by weight, of the glycidyl ester, 20–25 percent of the condensation product and 30–40 percent of the aminoplast resin. An especially preferred composition will contain about 45 percent, by weight, of the glycidyl ester, about 21 percent of the condensation product and about 34 percent of the aminoplast resin.

If one chooses to prepare a colored composition, a pigment can be added at this point by way of a conventional mill base based on any resin compatible with the film-forming components in this system. Generally speaking, this mill base can be prepared by grinding the pigment in the aminoplast resin or any compatible alkyd resin according to conventional techniques. The amount of mill base used is conventional and will depend on the depth of color desired.

One can also add to this mixture, if the need seems apparent, a conventional rheology control agent, a flow agent, an anticratering agent, an antoxidant, or the like.

How the Composition is Applied

All that is required to bring the coating composition to application viscosity is to heat it to approximately 40°–55°C. The composition can also be reduced to application viscosity by adding a conventional thinner such as toluene, methylethyl ketone or acetone. In general, this causes no problems for the composition will be compatible with most organic liquids. But this dilution is ordinarily unnecessary for it only introduces organic liquids into the composition which the law now requires to be at low concentration or completely absent and whose presence confers no special advantage.

However the composition is thinned, it is ordinarily sprayed to whatever substrate is being coated, although other techniques such as brushing, dipping, roller-coating or doctor-blading can be used. If spray application is the method of choice, those skilled in the art will be pleased to note that no special spraying equipment or techniques are required. The composition can be conventionally sprayed with no loss of quality or economy.

The thickness to which the composition is applied is largely a matter of choice, but it is possible in most cases to apply a somewhat thicker coat than is the rule with conventional coating compositions without the accompanying sagging and running.

The composition, however it is applied, is then cured by baking the coated article for approximately ½ hour at 120°–180°C., to give a hard, durable, flexible, strongly adherent finish which shows excellent resistance to staining by household materials.

DESCRIPTION OF THE PREFERRED EMBODIMENTS

Those skilled in the polymer and paint art will be able to practice my invention with greater ease after having read the following illustrative example. These artisans will, no doubt, be able to compose numerous variations on the example's theme, such as the introduction of substituents not shown here onto the basic molecule and the use of other conventional adjuncts. All of these variations are within the inventive concept.

In the example all parts are by weight.

Part A

The following were mixed together in a reaction kettle:

|  | Parts |
| --- | --- |
| Fumaric acid | 116 |
| Propylene glycol | 76 |
| Toluenesulfonic acid | 0.5 |
| p-methoxyphenol | 0.1 |

This mixture was heated to 135°–146°C. and held there for 45 minutes to 1 hour, while approximately 18 parts of water were given off.

Cardura E ester, 120 parts, was then added to the reaction mixture over a 2-minute period. The mixture was then held at 180°–200°C. for approximately 1 hour, while 2–3 parts of an impurity in the form of a distillate were collected. The resulting product was an oily straw-colored liquid, having a Gardner-Holdt viscosity of Z2–Z3.

Maleic acid or itaconic acid can be used in place of fumaric acid in this process, in equivalent molar amounts, with substantially the same result. Similarly, ethylene glycol or glycerol can be substituted for propylene glycol.

Part B

The following were mixed together in a reaction kettle:

|  | Parts |
| --- | --- |
| Glycerol | 1057 |
| Fumaric acid | 2610 |
| Propylene glycol | 855 |
| Normal butanol | 832 |
| p-toluenesulfonic acid | 10 |
| Methoxyhydroquinone | 1.5 |

This mixture was heated, with stirring, to a temperature of 140°C. and held within the range 140°–162°C. for 10 hours while 825 parts of water/butanol azeotrope were taken off.

The temperature of the reaction mass then rose to about 196°C. The mass was then cooled.

The resulting product was a clear, yellow, viscous liquid.

Part C
A paint was prepared by mixing together

|  | Parts |
|---|---|
| Product of (A) | 45 |
| Product of (B) | 21 |
| Mill base[1] | 151 |
| Hexamethoxymethylmelamine | 3 |
| Ditertiarybutyl peroxide | 0.4 |
| Anticratering agent[2] | 0.4 |
| Cellulose acetate butyrate (20% solution in butanol/ cellosolve acetate 50/50) | 1.0 |
| Calcium naphthenate | 0.3 |
| Antioxidant[3] | 0.2 |

[1] Mill base prepared by mixing together

| Hexamethoxymethyl melamine | 20 | parts |
|---|---|---|
| TiO$_2$ | 67 | |
| Nonionic surface active agent | 0.8 | |
| Deflocculant | 0.2 | |
| Normal butanol | 10 | |
| Toluene | 2 | | and then sand grinding the mixture.
[2] Sold by Nopco Div. - Diamond Shamrock Co. as 2219A.
[3] Plastonox 1721 - a 5%, by weight, solution in toluene/methylethyl ketone, sold by American Cyanamid Co.

This paint was heated to 55°C. and sprayed to a thickness of 1½ mils (dry) on a cold-rolled, phosphate treated steel panel. The panel was then heated for 30 minutes at 160°C. to give a glossy, hard, stain-resistant, flexible, durable finish.

I claim:
1. In a composition comprising
   A. a product obtained by condensing
      1. an unsaturated dibasic acid;
      2. a polyol; and
      3. an alkanol of 3–18 carbon carbon atoms, or an alkylene oxide of 4–18 carbon atoms; and
   B. an aminoplast resin,
the improvement comprising the presence in the composition of
   C. a compound represented by the structure where
   X is hydrogen, alkyl of 1–4 carbon atoms or phenyl;
   Y is hydrogen, —OH, —CH$_2$OH or alkyl of 1–4 carbon atoms (only one Y can be —OH);
   Z is 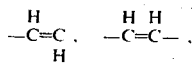

or

D$_1$ is hydrogen;
   D$_2$ is —OH;
   Q is or —O—;
   R is alkyl of 4–18 carbon atoms, or a singly, doubly or triply unsaturated hydrocarbon radical of 17 carbon atoms;
   $n$ is 0 or 1;
   $m$ is 1–5;
   $p$ is 0 or 1; and
   $t$ is 0 or 1.

2. The composition of claim 1 wherein
   1. the product in (A) is obtained by reacting 2 mols of propylene glycol, 2 mols of fumaric acid, 2 mols of glycerol and 1 mol of n-butanol;
   2. the aminoplast resin in (B) is hexamethoxymethyl melamine; and the compound in (C) is represented by the structure

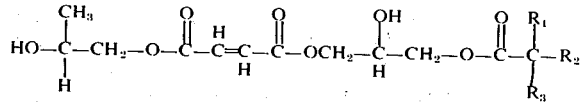

where R$_1$ is —CH$_3$ and R$_2$ and R$_3$ are lower alkyl, the total number of carbon atoms in R$_1$, R$_2$ and R$_3$ being 7–11.

* * * * *